(12) United States Patent
Chen et al.

(10) Patent No.: US 9,658,383 B2
(45) Date of Patent: May 23, 2017

(54) DISPLAY DEVICE

(71) Applicant: INNOLUX CORPORATION, Chu-Nan, Miao-Li County (TW)

(72) Inventors: Yen-Liang Chen, Chu-Nan (TW); Meng-Ko Tsai, Chu-Nan (TW); Kuei-Ling Liu, Chu-Nan (TW)

(73) Assignee: INNOLUX CORPORATION, Jhu-Nan (TW)

( * ) Notice: Subject to any disclaimer, the term of this patent is extended or adjusted under 35 U.S.C. 154(b) by 61 days.

(21) Appl. No.: 14/621,319

(22) Filed: Feb. 12, 2015

(65) Prior Publication Data
US 2015/0285984 A1 Oct. 8, 2015

(30) Foreign Application Priority Data

Apr. 2, 2014 (TW) .............................. 103112278 A

(51) Int. Cl.
*F21V 8/00* (2006.01)

(52) U.S. Cl.
CPC .......... *G02B 6/0043* (2013.01); *G02B 6/0036* (2013.01); *G02B 6/0065* (2013.01); *G02B 6/0061* (2013.01)

(58) Field of Classification Search
None
See application file for complete search history.

(56) References Cited

U.S. PATENT DOCUMENTS

| 6,130,777 A | 10/2000 | Yamashita et al. |
| 8,979,349 B2* | 3/2015 | Bita ...................... G02B 6/0036 362/615 |
| 2004/0248049 A1 | 12/2004 | Tsai |
| 2005/0270802 A1* | 12/2005 | Hsu .................... G02F 1/133615 362/626 |
| 2009/0129119 A1 | 5/2009 | Lee et al. |
| 2010/0014316 A1* | 1/2010 | Yue ...................... G02B 6/0036 362/619 |
| 2014/0307465 A1* | 10/2014 | Choi .................. G02F 1/133615 362/606 |

FOREIGN PATENT DOCUMENTS

| CN | 202093197 | 12/2011 |
| JP | 2006278348 | 10/2006 |
| KR | 20100092757 | 8/2010 |
| KR | 20120057806 | 6/2012 |
| TW | M368806 | 11/2009 |
| TW | 201040577 | 11/2010 |
| WO | 2009/079275 | 6/2009 |

* cited by examiner

*Primary Examiner* — Jong-Suk (James) Lee
*Assistant Examiner* — Eric T Eide
(74) *Attorney, Agent, or Firm* — Liu & Liu

(57) ABSTRACT

A display device is disclosed, which comprises: a display panel; and a backlight module corresponding to the display panel. The backlight module comprises: a light source; and a light guide plate adjacent to the light source and having a surface, wherein at least one light guide dot with an embossment and a cavity is disposed on the surface of the light guide plate, and the cavity surrounds the embossment.

11 Claims, 10 Drawing Sheets

DISPLAY DEVICE

CROSS REFERENCE TO RELATED APPLICATION

This application claims the benefits of the Taiwan Patent Application Serial Number 103112278, filed on Apr. 2, 2014, the subject matter of which is incorporated herein by reference.

BACKGROUND OF THE INVENTION

1. Field of the Invention

The present invention relates to a display device and, more particularly, to a display device equipped with a light guide plate with a specific structure.

2. Description of Related Art

As the electronic products progressed, the demands for the same are also increased. For display devices, display quality thereof is one item that consumers request. Backlight modules are one essential unit in the display devices, and the efficiency thereof is also one factor related to the display quality of the display device. In general, the backlight module is assembled with a rear frame, a light guide plate, a light source and plural optical films, and provides light into the display panel.

The general used light source is a linear light source or a point light source. If it is desired to evenly illuminate light into the display panel, except for disposing the optical films properly, the light guide plate is used to firstly scatter the light from the light source. In the general backlight module, the light from the light source is firstly emitted into the light guide plate, followed by scattering with the light guide plate, passing through plural optical films and illuminating into the display panel. In order to obtain the best scattering effect of the light guide plate, a micro-pattern is formed on a reflection plane (i.e. a side opposite to the light emitting surface of the light guide plate with the display panel disposed thereon) of the light guide plate.

Herein, the micro-pattern on the light guide plate is one main factor related to the light scattering effect thereof. Therefore, it is desirable to provide a light guide plate with specific structure to improve the light emitting amount thereof.

SUMMARY OF THE INVENTION

An object of the present invention is to provide a display device, wherein the backlight module used therein comprises a light guide plate with a specific structure to increase light emitting amount of the backlight module.

Another object of the present invention is to provide a method for manufacturing a light guide plate for a backlight module of a display device, which can be used to produce a light guide plate capable of increasing light emitting amount of the backlight module in a simple and rapid way.

To achieve the object, the method for manufacturing the light guide plate for the backlight module of the display device comprises the following steps: providing a mold disposed with at least one protrusion and at least one recess on a surface thereof; wherein each recess corresponds to and is surrounded with the protrusion; providing a material for forming a light guide plate on the mold; and curing the material for forming the light guide plate and removing the mold to obtain the light guide plate.

After the aforementioned steps, a light guide plate with a specific structure in one aspect of the present invention is obtained, in which at least one light guide dot with an embossment and a cavity is disposed on a surface of the light guide plate, and the cavity surrounds the embossment.

When the surface of the light guide plate is considered as a reference surface, the embossment is protruded from the reference surface, the cavity is recessed into the reference surface, the embossment has a (maximum) first width (w1) based on the reference surface, the cavity has a (maximum) second width (w2) based on the reference surface, and the (maximum) first width (w1) is larger than the (maximum) second width (w2) (w1>w2). Preferably, a ratio of the (maximum) second width to the (maximum) first width is larger than or equal to 0.05 as well as less than or equal to 0.6 ($0.05 \leq w2/w1 \leq 0.6$). In addition, a ratio of a height (H) of the embossment to a depth (D) of the cavity is in a range from 1 to 2 ($1 \leq H/D \leq 2$).

When the light guide plate with the aforementioned specific structure is applied on a backlight module, the obtained backlight module can be assembled with a display panel to obtain a display device of the present invention. Hence, the display device of the present invention comprises: a display panel; and a backlight module corresponding to the display panel, wherein the backlight module comprises: a light source; and the aforementioned light guide plate adjacent to the light source.

In the present invention, the light guide plate may comprise a first region and a second region, wherein the first region locates between the second region and the light source, at least two light guide dots are selectively disposed on the surface of the light guide plate in the second region thereof, and the light guide dots are adjacently disposed. Preferably, the cavities of two adjacent light guide dots are integrated into a concave. Especially, when the surface of the light guide plate is considered as a reference surface, the cavities are recessed into the reference surface, and the concave located between the embossments has a maximum depth.

Except for the aforementioned light guide plate, another light guide plate with a specific structure can also be obtained in another aspect of the present invention after the aforementioned steps for manufacturing the same, which can also be applied to a backlight module and assembled with a display panel to obtain a display device of the present invention. Hence, the display device of another aspect of the present invention comprises: a display panel; and a backlight module corresponding to the display panel, wherein the backlight module comprises: a light source; and a light guide plate of this aspect adjacent to the light source and having a surface. The light guide plate of this aspect comprises: a first region and a second region, and the first region locates between the second region and the light source, wherein at least one light guide dot with two first embossments and a cavity is disposed on the surface of the light guide plate in the second region thereof, and the first embossments are disposed in the cavity.

When the surface of the light guide plate is considered as a reference surface, the first embossments are respectively protruded from the reference surface, and the cavity is recessed into the reference surface. In addition, the cavity has a minimum second width (w2) and a maximum third width (w3), and a ratio of the minimum second width (w2) to the maximum third width (w3) is in a range from 0.05 to 0.2 ($0.05 \leq w2/w3 \leq 0.2$). In addition, the light guide dot may further selectively comprise a second embossment disposed in the cavity. Furthermore, the cavity preferably has a maximum depth between two adjacent first embossments.

Except for the aforementioned light guide plate, another light guide plate with a specific structure can also be obtained in further another aspect of the present invention after the aforementioned steps for manufacturing the same, which can also be applied to a backlight module and assembled with a display panel to obtain a display device of the present invention. Hence, the display device of further another aspect of the present invention comprises: a display panel; and a backlight module corresponding to the display panel, wherein the backlight module comprises: a light source; and a light guide plate of this aspect adjacent to the light source and having a surface. The light guide plate of this aspect comprises: a first region and a second region, and the first region locates between the second region and the light source, wherein at least one light guide dot has two embossments, two cavities and a concave, two embossments are adjacently disposed, each cavity respectively corresponds to and surrounds the embossment, and the concave is disposed between two adjacent embossments.

When the surface of the light guide plate is considered as a reference surface, the embossments are respectively protruded from the reference surface, and the cavities and the concave are respectively recessed into the reference surface. Preferably, a depth of the concave is larger than that of the cavity.

In the light guide plate and the display device comprising the same of the aforementioned aspect of the present invention, the cavity and/or the concave is recessed into the surface of the light guide plate (i.e. the reference surface), and the cavity and/or the concave may have different depth.

Furthermore, in the light guide plate and the display device comprising the same of the aforementioned aspect of the present invention, the embossment, the first embossment, the second embossment, the cavity and/or the concave may respectively have a rough surface.

Other objects, advantages, and novel features of the invention will become more apparent from the following detailed description when taken in conjunction with the accompanying drawings.

DETAILED DESCRIPTION OF THE PREFERRED EMBODIMENT

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

Hereinafter, the structures of the light guide plate (LGP), the backlight module and the display device and the methods for manufacturing the same of the present invention are illustrated in detail.

Figure 1:
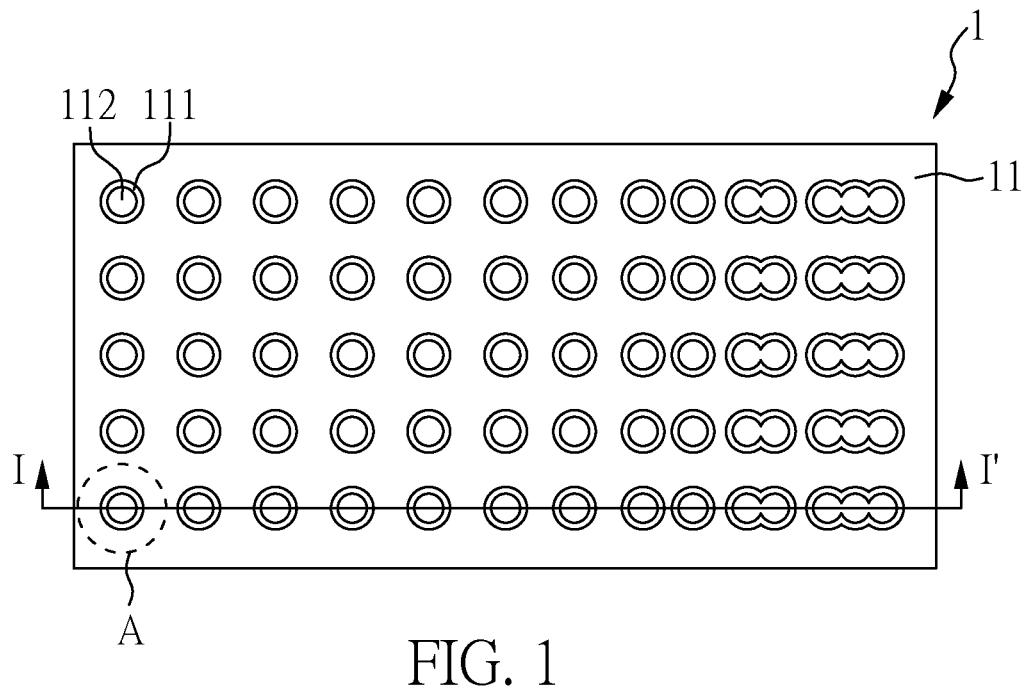
FIG. 1 is a perspective view of a mold for manufacturing a light guide plate according to one preferred embodiment of the present invention.

As shown in FIG. 1, a mold 1 with a patterned surface 11 is firstly provided. In the present embodiment, the mold 1 can be prepared with any material for forming the mold generally used in the art, such as metal. In addition, in the present embodiment, the pattern can be formed on the surface 11 of the mold 1 through any patterning manner generally used in the art, such as etching and laser.

Figure 2:
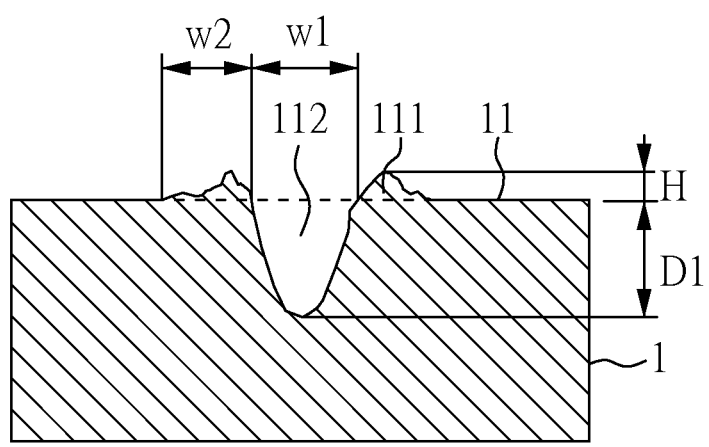
FIG. 2 is a cross-sectional view showing a part of a mold for manufacturing a light guide plate according to one preferred embodiment of the present invention.

FIG. 2 is a cross-sectional view of a region A in FIG. 1 along an I-I' line. As shown in FIG. 2, a protrusion 111 and a recess 112 is formed on the surface 11 of the template 1, and the protrusion 111 surrounds the recess 112. Herein, the protrusion 111 protrudes from the surface 11 thereof, and the recess 112 recesses into the surface 11 thereof. In addition, the recess 112 has a first width w1 and a depth D1, and the protrusion 111 has a second width w2 and a height based on the surface 11 of the mold 1.

Figure 3:
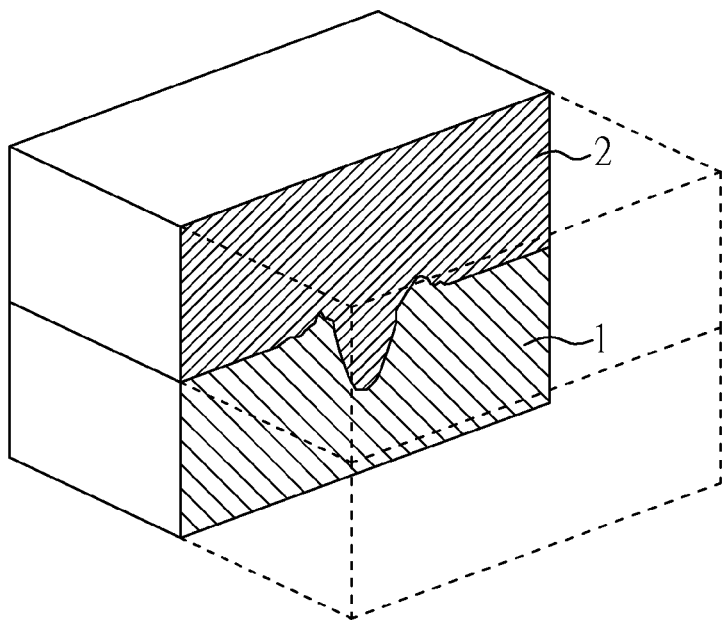
FIG. 3 is a perspective view of manufacturing a light guide plate through a molding process with the mold according to one preferred embodiment of the present invention.
Figure 4:
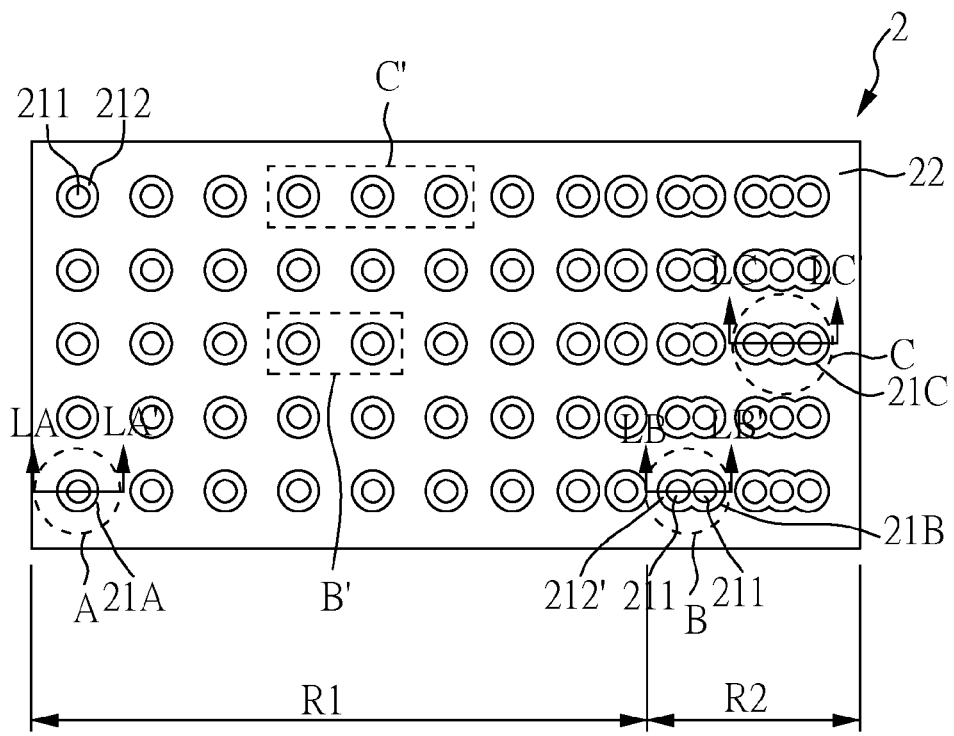
FIG. 4 is a perspective view of a light guide plate according to one preferred embodiment of the present invention.

Next, as shown in FIG. 3, a LGP 2 of the present embodiment is obtained through a molding process with the mold 1. More specifically, in the preset embodiment, a material for the LGP is applied onto the mold 1, followed by curing the same. After the mold 1 is removed, the LGP 2 of the present embodiment is obtained, as shown in FIG. 4. Herein, the material for the LGP can be any material generally used in the art, such as PMMA. In addition, in the present embodiment, the material for the LGP can be applied onto the mold 1 through any process generally used in the art, such as injection molding, coating (for example, dip coating, roll coating, printing, and spin coating), and imprinting. Furthermore, in the present embodiment, the material for the LGP can be cured through any process generally used in the art, such as photo curing and thermal curing. For removing the mold, a detaching layer (not shown in the figure) can be firstly formed on the mold 1, followed by applying the material for the LGP thereon.

For the conventional method for manufacturing the LGP, a laser patterning process is directly performed on the plate for forming the LGP, but this process is expensive and time consuming. However, the LGP of the present embodiment is produced with a molding process. Hence, in the process for manufacturing the LGP of the present embodiment, the process for pattering the mold is only performed for one time, and then plural LGPs can be sequentially obtained through the molding process with the mold. Therefore, the LGP of the present embodiment can be produced in a rapid, simple and low cost way.

Figure 11:
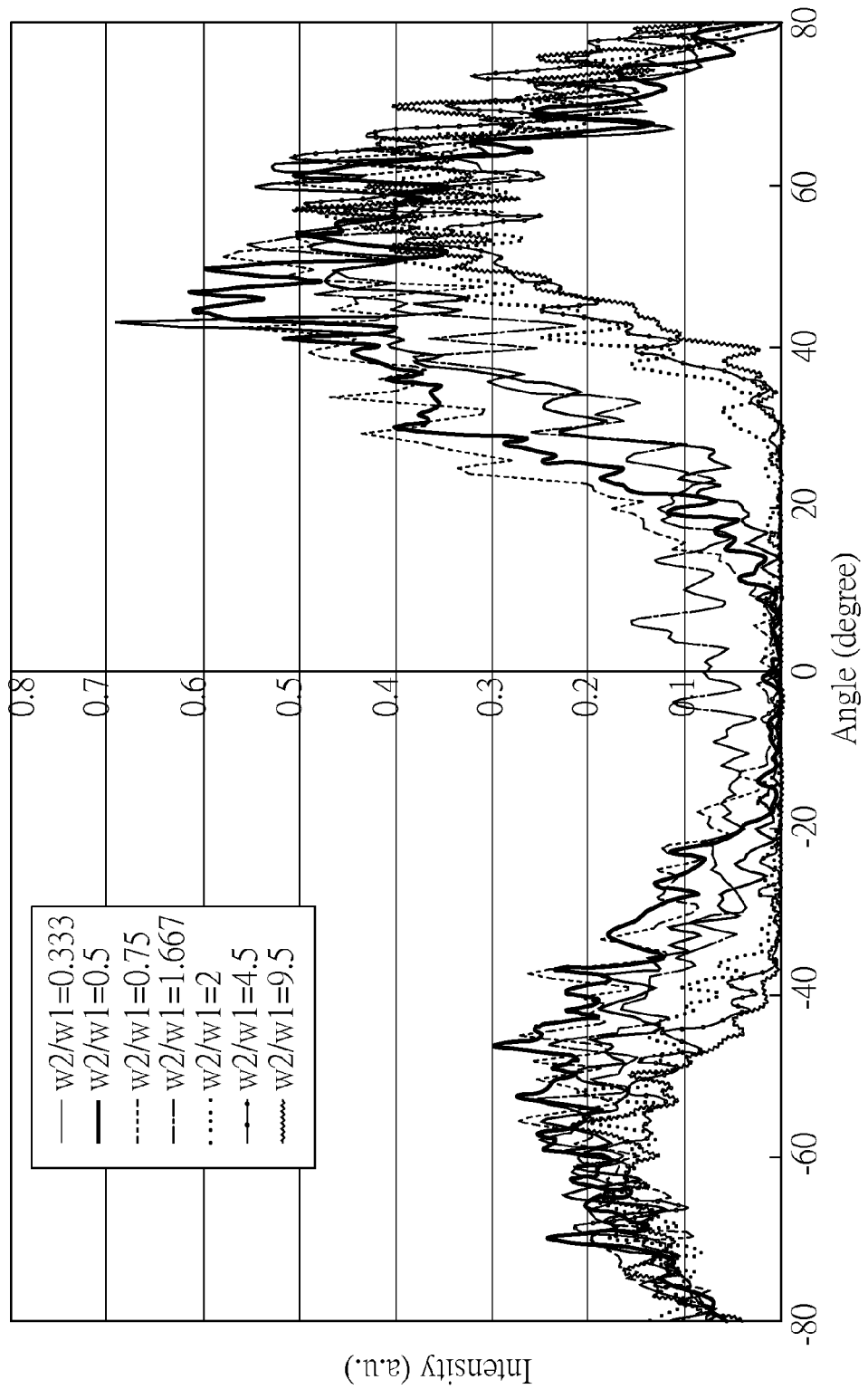
FIG. 11 is a diagram showing the relation between intensity and angles of emitting light by using a light guide plate having a structure of FIG. 2 and different w2/w1 ratio.
Figure 12:
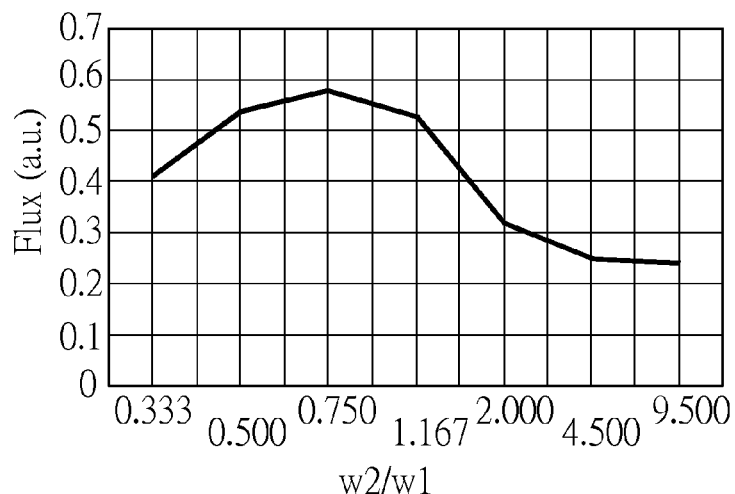
FIG. 12 is a diagram showing the relation between flux of emitting light and w2/w1 ratios by using a light guide plate having a structure of FIG. 2 and different w2/w1 ratio, in which a depth of a cavity is twofold of a height of an embossment.

Herein, light in all directions was illuminated into a LGP having the structure of FIG. 2 and prepared with PMMA, and the intensity of emitting light guided by the LGP between −80 degree and 80 degree was measured. The results are shown in FIG. 11 and FIG. 12, which are diagrams showing the relations between intensity and angles of emitting light by using the LGP having a structure of FIG. 2. Herein, FIG. 11 shows the relation between intensity and angles of emitting light by using the LGP having different w2/w1 ratio, in which a depth D1 of a cavity is twofold of a height H of an embossment, and FIG. 12 shows the relation between flux and w2/w1 ratios. The results indicate that a relative high light emitting amount can be maintained when a ratio of the second width w2 to the first width w1 is larger than or equal to 0.3 and less than or equal to 1 ($0.3 \leq w2/w1 \leq 1$). In addition, as shown in FIG. 11 and FIG. 12, in the case that the first width w1 is greater than the second width w2, the proportion of the second width w2 relative to the first width w1 has to be large enough to maintain the relative high light emitting amount. This result indicates that the proportion of the protrusion relative to the recess has to be high enough in order to obtain a preferred high light emitting amount.

Figure 5:
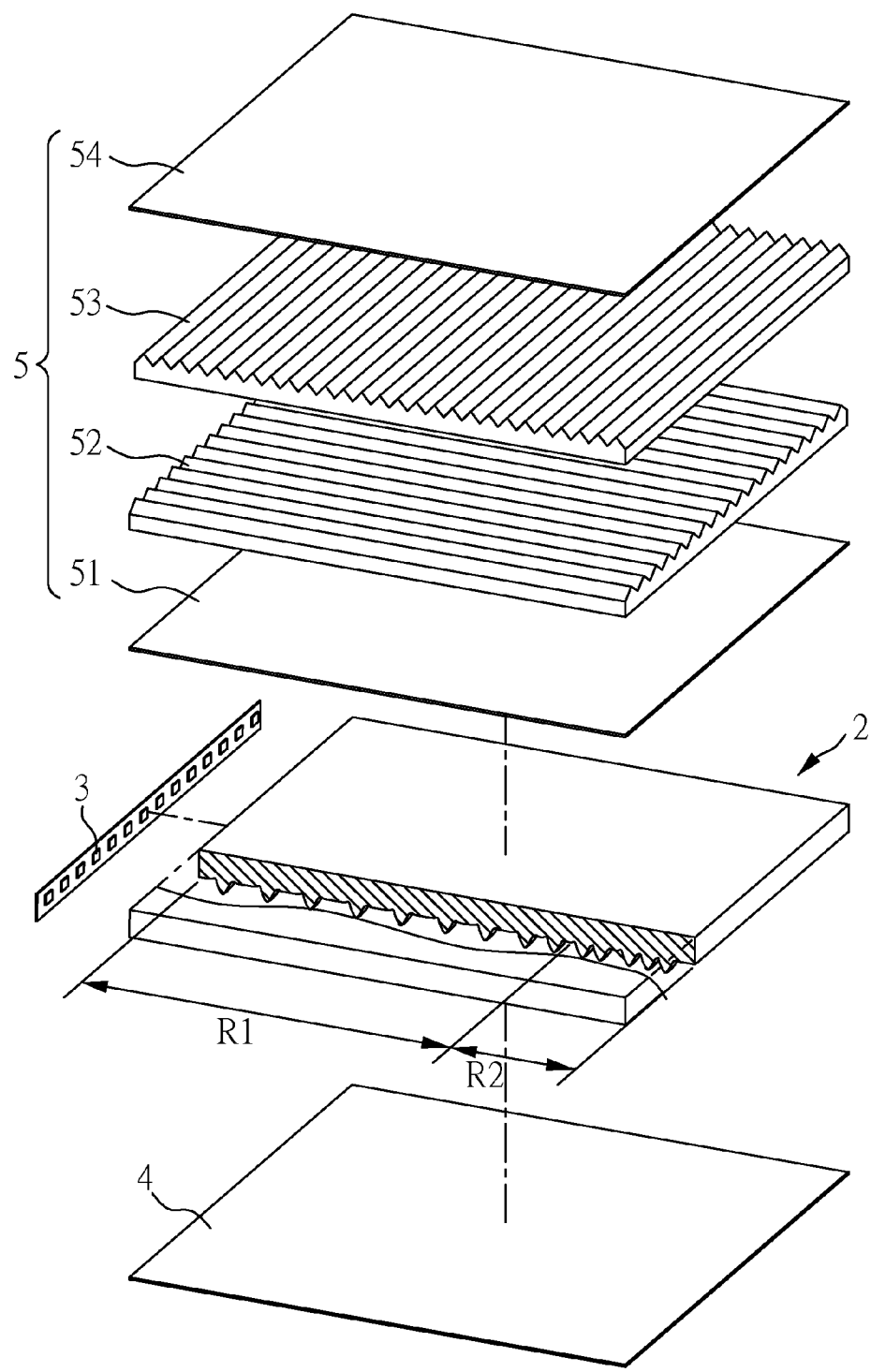
FIG. 5 is a perspective view of a backlight module according to one preferred embodiment of the present invention.

After the LGP of the present embodiment is obtained through the aforementioned process, the obtained LGP is assembled with other units for a backlight module to obtain the backlight module of the present embodiment. FIG. 5 is a perspective view showing the backlight module with the aforementioned LGP of the present embodiment. Herein, the LGP 2 is disposed on a rear frame 4, and a light source 3 is disposed adjacent to the LGP 2. In the present embodiment, the light source 3 comprises plural LEDs, but the present invention is not limited thereto. In addition, at least one optical film 5 is further disposed on the LGP 2. In the present embodiment, the optical film 5 comprises a diffusion layer 51, a first prism layer 52, a second prism layer 53 and another diffusion layer 54 sequentially formed on the LGP 2. Herein, as shown in FIG. 4 and FIG. 5, the LGP 2 of the present embodiment is defined to comprise a first region R1 and a second region R2, and the first region R1 locates between the second region R2 and the light source 3. The "first region R1" is adjacent to the light source 3 and can be considered as a near light region, and the "second region R2" is relative far from the light source 3 and can be considered as a far light region. However, in other embodiments, the first region R1 and the second region R2 are not limited to the regions indicated in FIG. 5, as long as the first region R1 locates between the second region R2 and the light source 3.

Figure 6:
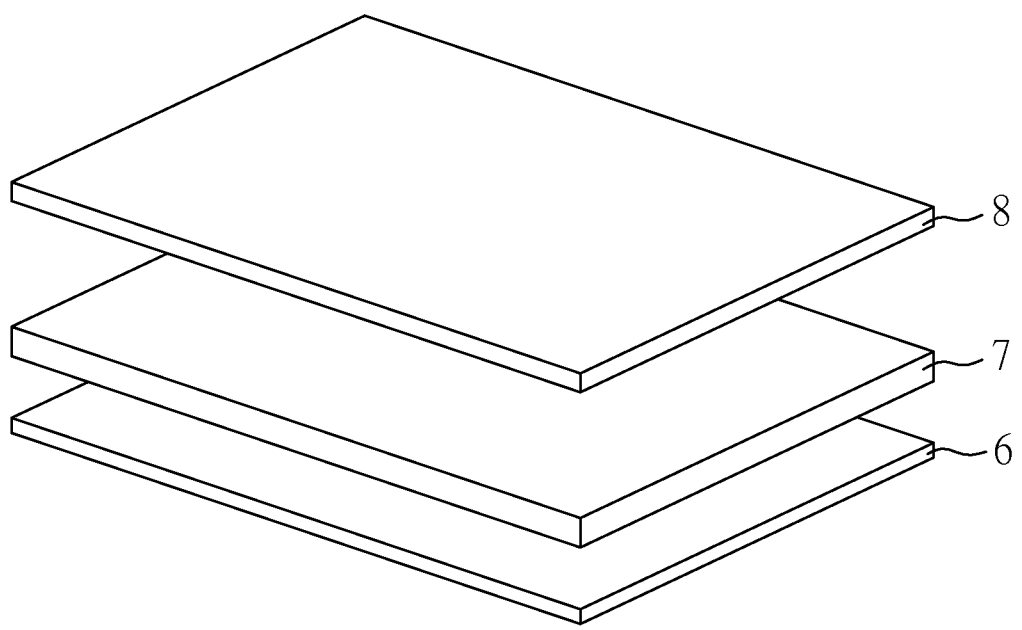
FIG. 6 is a perspective view of a display device according to one preferred embodiment of the present invention.

Finally as shown in FIG. 6, a display panel 7 is disposed on the aforementioned backlight module 6 to obtain the display device of the present embodiment. In the present embodiment, the display panel 7 can be the known one in the art, such as a liquid crystal display panel. In addition, a touch panel 8 may be selectively disposed on the display panel 7. However, in other embodiment, the touch panel 8 can be directly integrated into the display panel 7 or disposed inside the display panel 7 (not shown in the figure).

Hereinafter, the structure of the LGP of the present embodiment is illustrated in detail.

As shown in the region A in the first region R1 of FIG. 4, a light guide dot 21A with an embossment 211 and a cavity 212 is disposed on the surface 22 of the LGP 2, and the cavity 212 surrounds the embossment 211. When the surface 22 of the LGP 2 is considered as a reference surface, the embossment 211 is protruded from the reference surface, and the cavity 212 is recessed into the reference surface. Herein, the cavity 212 may have different depths.

Figure 7A:
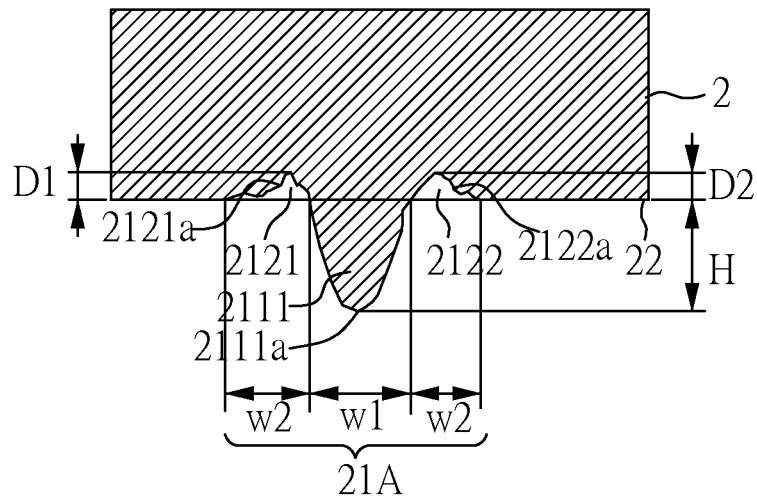
FIGS. 7A to 7C are cross-sectional views showing parts of a light guide plate according to one preferred embodiment of the present invention.

FIG. 7A is a cross-sectional view showing the region A of FIG. 4 along an LA-LA' line. In the case that the surface 22 of the LGP 2 is considered as a reference surface, the embossment 211 is protruded from the reference surface, and the cavity 212 is recessed into the reference surface. More specifically, the cavity 212 shown in FIG. 4 is disposed to surround the embossment 211; and the first embossment 2111 shown in FIG. 7A is the embossment 211 of FIG. 4, the cavity 212 shown in FIG. 4 can be divided into the left first cavity 2121 and the right second cavity 2122 in FIG. 7A, and the first cavity 2121 and the second cavity 2122 may have identical or different depth. In this embodiment, the depths of the first cavity 2121 and the second cavity 2122 are different. In addition, as shown in FIG. 7A, the first embossment 2111 corresponding to the embossment 211 of FIG. 4 has a rough surface 2111a, and the first cavity 2121 and the second cavity 2122 corresponding to the cavity 212 of FIG. 4 also have rough surfaces 2121a, 2122a. However, other light guide dots in the LGP of the present embodiment or other embodiments are not limited to have the structure shown in FIG. 7A, as long as the cavities 212 (as shown in FIG. 4) in different region have different depths. In the present embodiment, a ratio of the height H of the first embossment 2111 (i.e. the embossment 211 of FIG. 4) to the depth D1 of the first cavity 2121 or the depth D2 of the second cavity 2122 (i.e. the cavity 212 of FIG. 4) is in a range from 1 to 2 ($1 \leq H/(D1 \text{ or } D2) \leq 2$). The first embossment 2111 has a first width w1, the first cavity 2121 and second cavity 2122 respectively have a second width w2, and the first width w1 is larger than the second width w2. Preferably, a ratio of the second width w2 to the first width w1 is larger than or equal to 0.05 as well as less than or equal to 0.6 ($0.05 \leq w2/w1 \leq 0.6$). In other embodiment of the present invention, the width, the height and the depth of the embossment and the cavity is not particularly limited, as long as the ratio thereof satisfies the aforementioned range. Herein, FIG. 7A only illustrated the cross-section of FIG. 4 along the LA-LA' line. However, the relation between the width, the height and the depth of the embossment and the cavity are not limited to those obtained with a single cross-sectional line, and the width, the height and the depth of the embossment and the cavity can be obtained with plural different cross-sectional lines. Furthermore, the widths of the embossment and the cavity may be varied along different cross-sectional lines, and all of them are belonged to the scope of the present invention, as long as the embossment and the cavity respectively has a maximum first width and a maximum second width based on the surface of the LGP and the relation between the first width and the second width satisfies the aforementioned definition.

As shown in the region B in the first region R1 of FIG. 4, a light guide dot 21B with two embossments 211 and an integrated cavity 212' is disposed on the surface 22 of the LGP 2, and the integrated cavity 212' surrounds the embossment 211. When the surface 22 of the LGP 2 is considered as a reference surface, the embossments 211 are protruded from the reference surface, and the integrated cavity 212' is recessed into the reference surface. Herein, the integrated cavity 212' may have different depths.

Figure 7B:
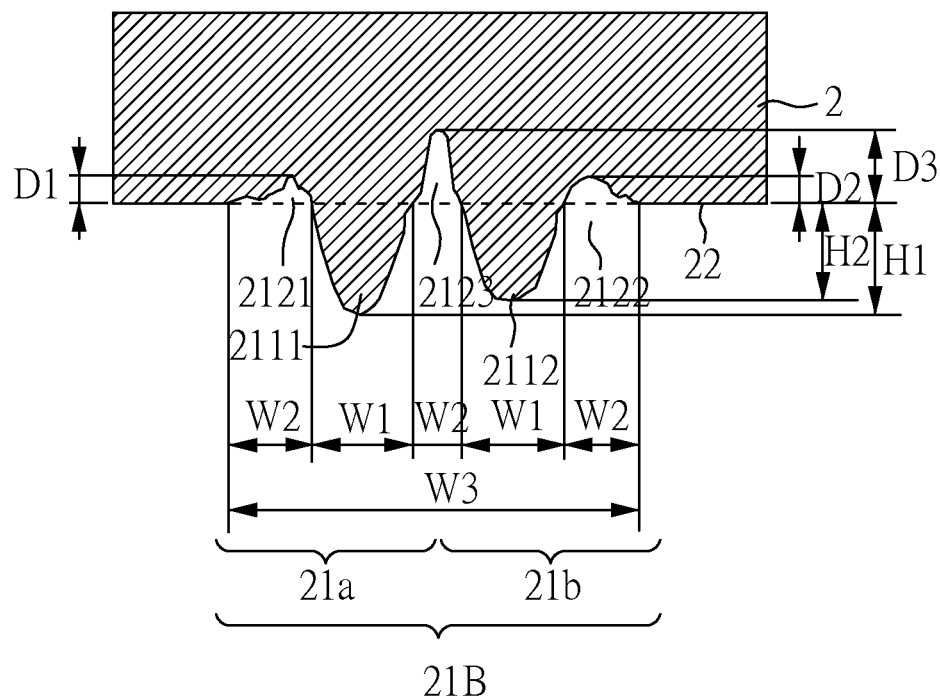

FIG. 7B is a cross-sectional view showing the region B of FIG. 4 along an LB-LB' line. Not only the light guide dot 21a of FIG. 7A is disposed on the LGP 2, but also another light guide dot 21b is disposed thereon. In addition, the light guide dot 21a is adjacent to the light guide dot 21b, and a left first cavity 2121 and a right second cavity 2122 are integrated into a concave (i.e. a third cavity 2123).

As shown in FIG. 7B, two embossments 211 of FIG. 4 are divided into a first embossments 2111 and a second embossments 2112, and the integrated cavity 212' of FIG. 4 is divided into a left first cavity 2121, a right second cavity 2122, and a third cavity 2123 located between the first cavity 2121 and the second cavity 2122. The depths of the first cavity 2121, the second cavity 2122 and the third cavity 2123 may be identical or different. As shown in FIG. 7B, the first cavity 2121, the second cavity 2122 and the third cavity 2123 respectively have a depth D1, a depth D2 and a depth D3. In the present embodiment, the depth D3 of the third cavity 2123 is a maximum depth, but the present invention is not limited thereto. In addition, the first embossments 2111 and the second embossments 2112 respectively have heights H1, H2, which may be identical or different. In the present embodiment, a ratio of the height H1 of the first embossments 2111 or the height H2 of the second embossments 2112 (i.e. the embossment 211 of FIG. 4) to the depth D1 of the first cavity 2121, the depth D2 of the second cavity 2122 or the depth D3 of the third cavity 2123 may be in a range from 1 to 2 ($1 \leq$(H1 or H2)/(D1, D2 or D3)$\leq 2$). In one embodiment, the first widths w1 of the first embossments 2111 and the second embossments 2112 are larger than the second widths w2 of the first cavity 2121, the second cavity 2122 and the third cavity 2123. Preferably, a ratio of the second width w2 to the first width w1 is larger than or equal to 0.05 as well as less than or equal to 0.6 ($0.05 \leq$w2/w1$\leq 0.6$). In other embodiment of the present invention, the width, the height and the depth of the embossment and the cavity is not particularly limited, as long as the ratio thereof satisfies the aforementioned range. Herein, FIG. 7B only illustrated the cross-section of FIG. 4 along the LB-LB' line. However, the relation between the width, the height and the depth of the embossment and the cavity are not limited to those obtained with a single cross-sectional line, and the width, the height and the depth of the embossment and the cavity can be obtained with plural different cross-sectional lines. Furthermore, the widths of the embossment and the cavity may be varied along different cross-sectional lines, and all of them are belonged to the scope of the present invention, as long as the embossment and the cavity respectively has a maximum first width and a maximum second width based on the surface of the LGP and the relation between the first width and the second width satisfies the aforementioned definition.

In addition, as shown in FIG. 4 and FIG. 7B, a border of the integrated cavity 212' has a maximum third width w3, in which a ratio of the second width w2 to the maximum third width w3 is in a range from 0.05 to 0.2 ($0.05 \leq$w2/w3$\leq 0.2$). However, other light guide dots in the LGP of the present embodiment or other embodiments are not limited to have the structure shown in FIG. 7B, as long as the first embossments 2111 and the second embossments 2112 have different heights and widths as well as the first cavity 2121, the second cavity 2122 and the third cavity 2123 may have different heights and widths. In addition, the relation between the second width w2 and the third width w3 are not limited to those obtained with a single cross-sectional line, and can be obtained with plural different cross-sectional lines. Furthermore, the second width w2 and the third width w3 may be varied along different cross-sectional lines, and all of them are belonged to the scope of the present invention, as long as the second width w2 and the third width w3 satisfies the aforementioned definition.

Figure 7C:
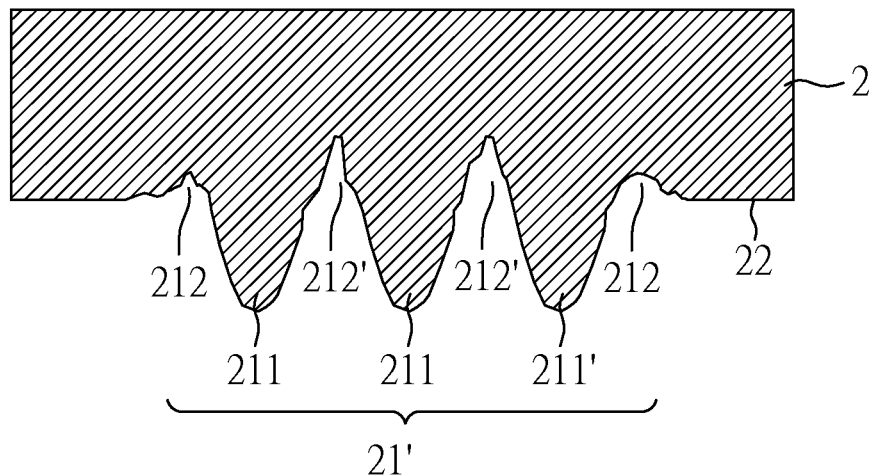

In addition, only the region R2 of the LGP 2 with two adjacent light guide dots 21a, 21b formed thereon are illustrated (as shown in FIG. 5 and FIG. 7B), but three adjacent light guide dots may be formed on the region R2 of the LGP 2 in other embodiment (as shown in FIG. 7C). The structure of FIG. 7C is similar to that of FIG. 7B, and not described repeatedly.

FIG. 7C is a cross-sectional view showing the region C in the region R2 of the LGP shown in FIG. 4 along an LC-LC' line. When the light guide dot 21B of FIG. 7B further comprises another embossment, the obtained light guide dot can be shown as the light guide dot 21C in FIG. 4 and in FIG. 7C. As shown in FIG. 7C, the light guide dot 21' further comprises a second embossment 211' disposed in the cavity 212.

When the light illuminated into the LGP, the embossment and the cavity formed thereon can break the total reflection of the illuminated light to guide the light outside the LGP. In addition, the rough surfaces of the embossment and the cavity on the LGP can scatter the illuminated light to make the guided light evenly illuminate into the display panel.

Figure 8:
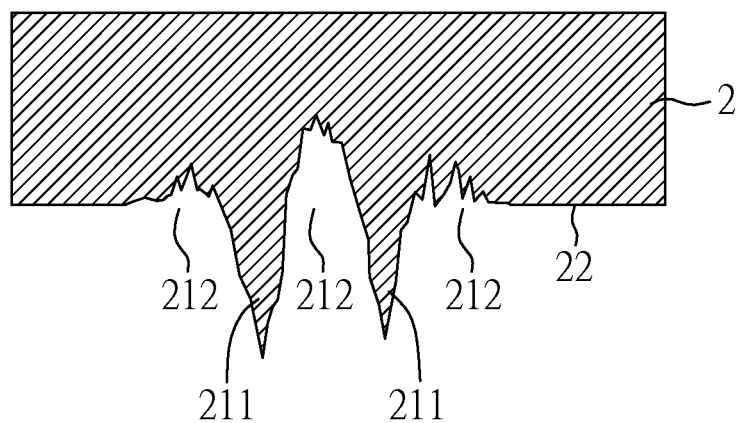
FIG. 8 is a cross-sectional view showing a part of a light guide plate according to another preferred embodiment of the present invention.

When the material with low viscosity is used to form the LGP through an injection molding process, the LGP having the structures of FIGS. 7A to 7C can be obtained. When the material with high viscosity is used to form the LGP through an injection molding process, the LGP having the structures of FIG. 8 can be obtained.

In addition, as shown in FIG. 4, the LGP of the present embodiment comprises the light guide dots shown in FIGS. 7A to 7C, but the present invention is not limited thereto. For example, in other embodiment of the present invention, the LGP can be formed to have two types of the light guide dots selected from those shown in FIGS. 7A to 7C. Furthermore, the arrangement of the light guide dots is not limited to the linear arrangement shown in FIG. 4, and the combination and the arrangement of the light guide dots shown in FIGS. 7A to 7C can be adjusted if it is required.

Herein, the light emitting efficiency of the LGP of the present invention is measured.

In the present test, light in all directions was illuminated into LGPs respectively having the structures shown in regions B, B', C and C' of FIG. 4, and the intensity of emitting light guided by the LGPs between −80 degree and 80 degree was measured. The results are shown in FIG. 9 and FIG. 10.

Figure 9:
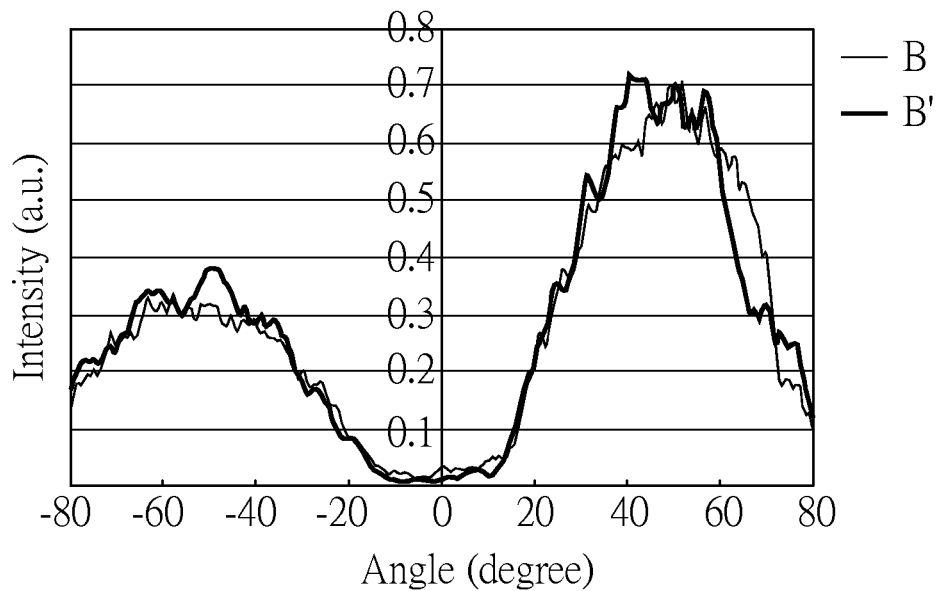
FIG. 9 is a diagram showing the relation between intensity and angles of emitting light in regions B and B' of a light guide plate of FIG. 4 in one preferred embodiment of the present invention.
Figure 10:
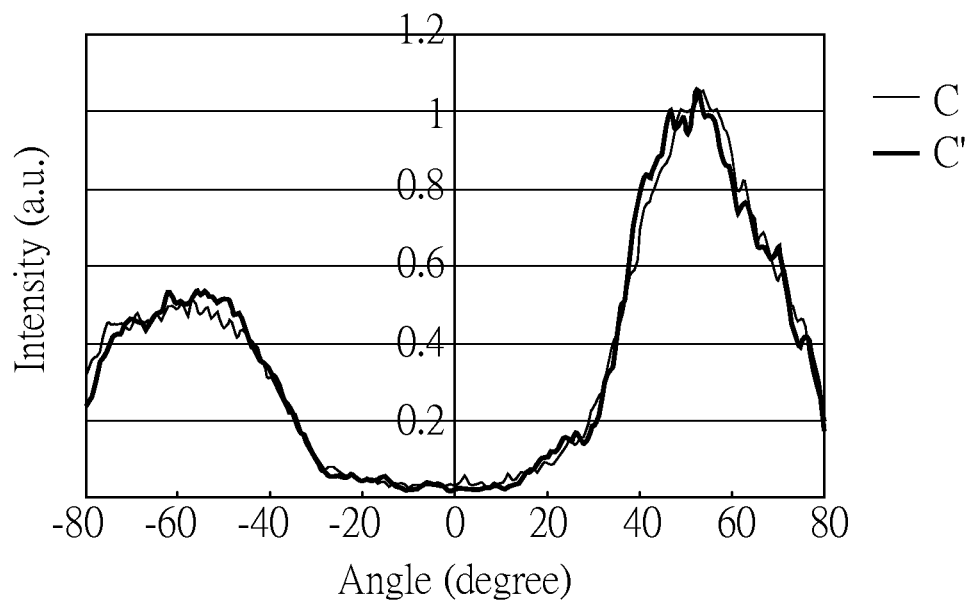
FIG. 10 is a diagram showing the relation between intensity and angles of emitting light in regions C and C' of a light guide plate of FIG. 4 in one preferred embodiment of the present invention.

As shown in FIG. 9, for the LGPs having the structures shown in the regions B and B' of FIG. 4, there is no significant difference in the relation between the intensity and the angles of the emitting light. However, regarding the light emitting amount through the intensity integral transforms, the maximum intensity of the emitting light is 0.83 (a.u.) for the LGP having the structure shown in the region B' of FIG. 4, but 0.8553 (a.u.) for the LGP having the structure shown in the region B of FIG. 4. Hence, the gain of the light emitting amount in the LGP having the structure of the region B can be increased about 2.96%, compared to that of the region B'. In addition, as shown in FIG. 10, for the LGPs having the structures shown in the regions C and C' of FIG. 4, there is no significant difference in the relation between the intensity and the angles of the emitting light. However, regarding the light emitting amount through the intensity integral transforms, the maximum intensity of the emitting light is 1.076 (a.u.) for the LGP having the structure shown in the region C' of FIG. 4, but 1.077 (a.u.) for the LGP having the structure shown in the region C of FIG. 4. Hence, the gain of the light emitting amount in the LGP having the structure of the region C can be increased about 0.09%, compared to that of the region C'. These results indicate that the gain of the LGP having two adjacent embossment 211 compared to that having two separated embossment 211 (2.96%) is higher than the gain of the LGP having three adjacent embossment 211 compared to that having three separated embossment 211 (0.09%). Hence, for the purpose of obtaining the best scattering effect in the LGP, the light guide dots 21B, 21C shown in FIGS. 7B and 7C can be selected to form on the LGP, especially in the far light region (i.e. the region R2) of the LGP to obtain the maximum light emitting amount. In addition, in a limited area, the light guide dot 21B shown in FIG. 7B can be selected to form the LGP to obtain the maximum gain of the light emitting amount.

Figure 13:
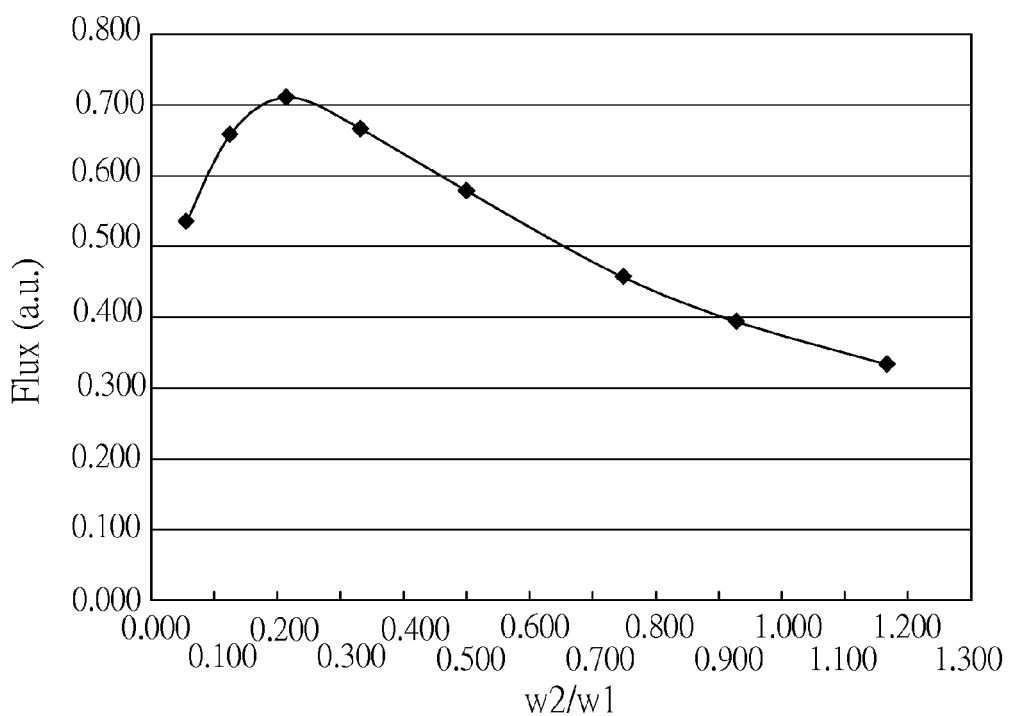
FIG. 13 is a diagram showing the relation between flux of emitting light and w2/w1 ratios by using a light guide plate having a structure of FIG. 7A and different w2/w1 ratio, in which a height of an embossment is twofold of a depth of a cavity.
Figure 14:
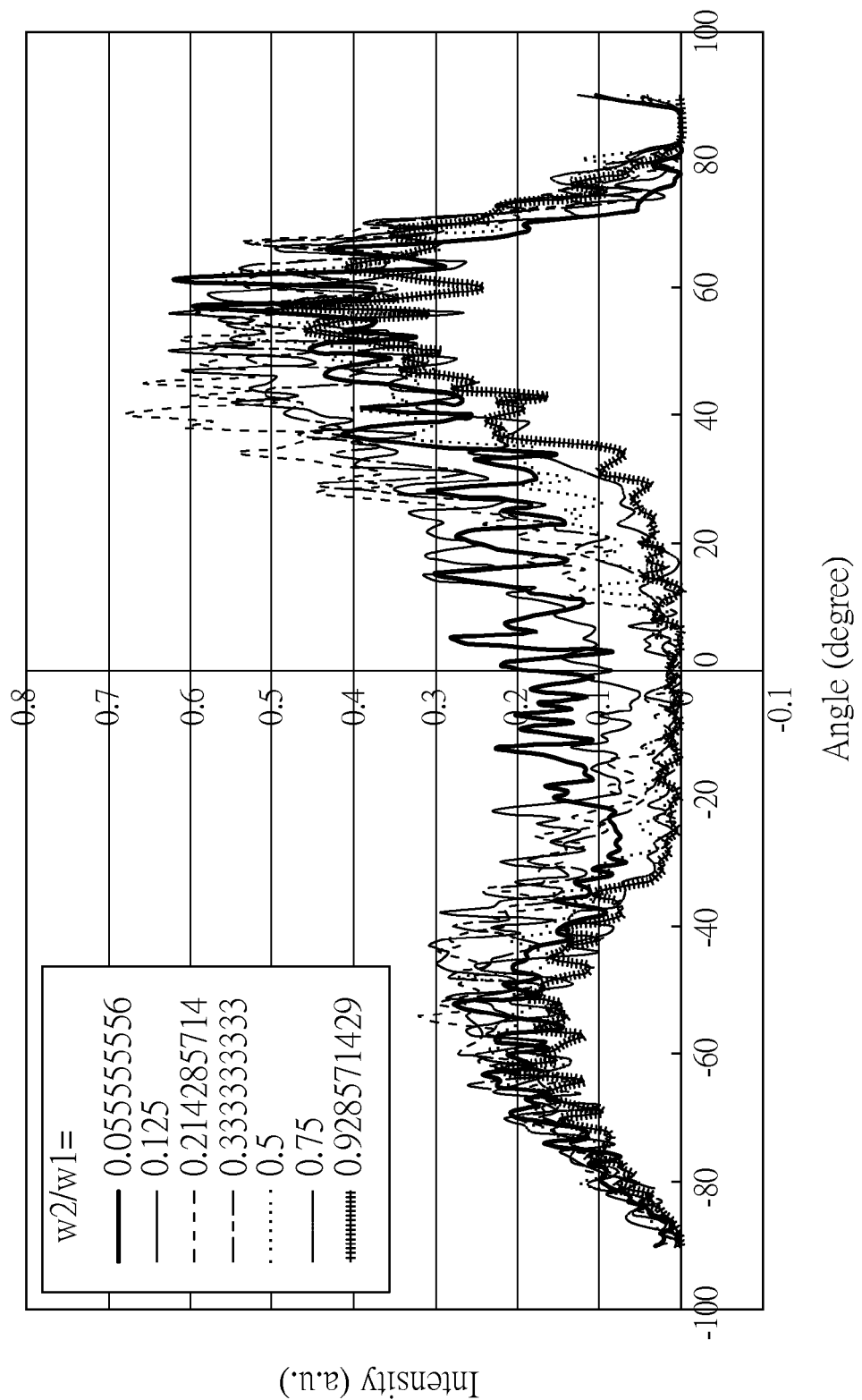
FIG. 14 is a diagram showing the relation between intensity and angles of emitting light by using a light guide plate having a structure of FIG. 7A and different w2/w1 ratio.

In addition, the relation between intensity and angles of emitting light by using the LGP having the structure of FIG. 7A and different w2/w1 ratio of the present invention is also measured according to the aforementioned method. The results are shown in FIGS. 13 and 14, which indicate that a relative high and ideal light emitting amount can be obtained when a ratio of the second width w2 to the first width w1 is larger than or equal to 0.05 as well as less than or equal to 0.6 ($0.05 \leq w2/w1 \leq 0.6$).

Furthermore, the display device provided by the present invention can be applied to any electronic device for displaying images, such as a mobile phone, a notebook, a camera, a video camera, a music player, a navigation system, or a television.

Although the present invention has been explained in relation to its preferred embodiment, it is to be understood that many other possible modifications and variations can be made without departing from the spirit and scope of the invention as hereinafter claimed.

What is claimed is:

1. A display device, comprising:
a display panel; and
a backlight module corresponding to the display panel and comprising:
a light source; and
a light guide plate adjacent to the light source and having a surface,
wherein the surface of the light guide plate comprises two light guide dots, and the two light guide dots are adjacently disposed, each light guide dot has an embossment and a cavity that surrounds the embossment, and
wherein on the basis of the surface of the light guide plate as a reference surface, the embossments of the two light guide dots are protruded from the reference surface, the cavities of the two light guide dots are recessed into the reference surface, the cavities of the two light guide dots are integrated into a concave, and the concave located between the embossments of the two light guide dots has a maximum depth greater than deepest sections of the cavities not located between the two light guide dots.

2. The display device as claimed in claim 1, wherein one of the embossments of the two light guide dots has a first width based on the reference surface, one of the cavities of the two light guide dots has a second width based on the reference surface, and the first width is larger than the second width.

3. The display device as claimed in claim 2, wherein a ratio of the second width to the first width is larger than or equal to 0.05 as well as less than or equal to 0.6.

4. The display device as claimed in claim 1, wherein a ratio of a height of one of the embossments of the two light guide dots to a depth of one of the cavities of the two light guide dots is in a range from 1 to 2.

5. The display device as claimed in claim 1, wherein the light guide plate comprises a first region and a second region, the first region locates between the second region and the light source, the two light guide dots are disposed on the surface of the light guide plate in the second region thereof.

6. The display device as claimed in claim 1, wherein one of the cavities of the two light guide dots has different depths.

7. The display device as claimed in claim 1, wherein the embossments of the two light guide dots and the cavities of the two light guide dots respectively has a rough surface.

8. A display device, comprising:
a display panel; and
a backlight module corresponding to the display panel and comprising:
a light source; and
a light guide plate adjacent to the light source and having a surface, wherein the light guide plate comprises a first region and a second region, and the first region locates between the second region and the light source,
wherein the surface corresponding to the second region comprises at least one light guide dot with two first embossments and a cavity, and the two first embossments are disposed in the cavity; and
wherein on the basis of the surface of the light guide plate as a reference surface, the two first embossments are respectively protruded from the reference surface, and the cavity is recessed into the reference surface,
wherein one of the two first embossments has a first width and the cavity has a minimum second width and a maximum third width, and a ratio of the minimum second width to the maximum third width is in a range from 0.05 to 0.2,
wherein the cavity has a maximum depth between the two first embossments, and the maximum depth is greater than deepest sections of the cavity not located between the two first embossments.

9. The display device as claimed in claim 8, wherein the light guide dot further comprises a second embossment disposed in the cavity.

10. The display device as claimed in claim 8, wherein the cavity has different depths.

11. The display device as claimed in claim 8, wherein the two first embossments and the cavity respectively has a rough surface.

* * * * *